United States Patent [19]
Brown

[11] 3,777,345
[45] Dec. 11, 1973

[54] TOOL FOR GEAR FINISH FORMING

[75] Inventor: Graham Maurice Brown, Daventry, England

[73] Assignee: Machine Tool Divisional Services Limited, Coventry, England

[22] Filed: Sept. 18, 1972

[21] Appl. No.: 289,831

[30] Foreign Application Priority Data
Sept. 17, 1971   Great Britain..................43472/71

[52] U.S. Cl.................................. 72/102, 29/159.2
[51] Int. Cl............................................. B21h 5/00
[58] Field of Search....................... 72/102; 29/159.2

[56]  References Cited
UNITED STATES PATENTS

| | | | |
|---|---|---|---|
| 1,847,848 | 3/1932 | Ragan | 29/159.2 |
| 3,631,703 | 1/1972 | Bregi et al. | 29/159.2 |
| 3,704,612 | 12/1972 | Loos | 72/102 |
| 3,733,886 | 5/1973 | Loos | 29/159.2 |

*Primary Examiner*—Lowell A. Larson
*Attorney*—John W. Malley et al.

[57]   ABSTRACT

A toothed tool for finish forming, by rolling, a cylindrical or helical work gear, said tool having, in the flanks of its teeth, serrations extending perpendicular to the axis of the tool which define flutes in the tooth flanks and intervening lands, the flutes on each tooth flank extending alternately from the tip towards the root and from the root towards the tip and extending along part only of the length of the tooth flank and being so disposed that corresponding flutes on successive tooth flanks are disposed helically on the circumference of the tool.

2 Claims, 5 Drawing Figures

TOOL FOR GEAR FINISH FORMING

It is known to finish form a cylindrical or helical work gear by gear rolling. This procedure involves running the work gear in mesh with and with its axis parallel to that of a correspondingly toothed driven tool, which forms the flanks of the teeth of the work gear to the desired final configuration by effecting plastic deformation of the metal of the work gear as distinct from removal of metal from the work gear by a cutting action as in gear shaving. The radial thrust between the tool and the work gear is accordingly high and it has been proposed, with a view to reducing the reaction load which has to be taken, to form in the flanks of the teeth of the tool flutes which extend from tip to root of the teeth and which define between them lands which form the working faces of the tooth flanks.

The present invention provides a toothed tool for finish forming, by rolling, a cylindrical or helical work gear said tool having, in the flanks of its teeth, serrations extending perpendicular to the axis of the tool which define flutes in the tooth flanks and intervening lands, the flutes on each tooth flank extending alternately from the tip towards the root and from the root towards the tip and extending along part only of the length of the tooth flank and being so disposed that corresponding flutes on successive tooth flanks are disposed helically on the circumference of the tool.

Figure 1:
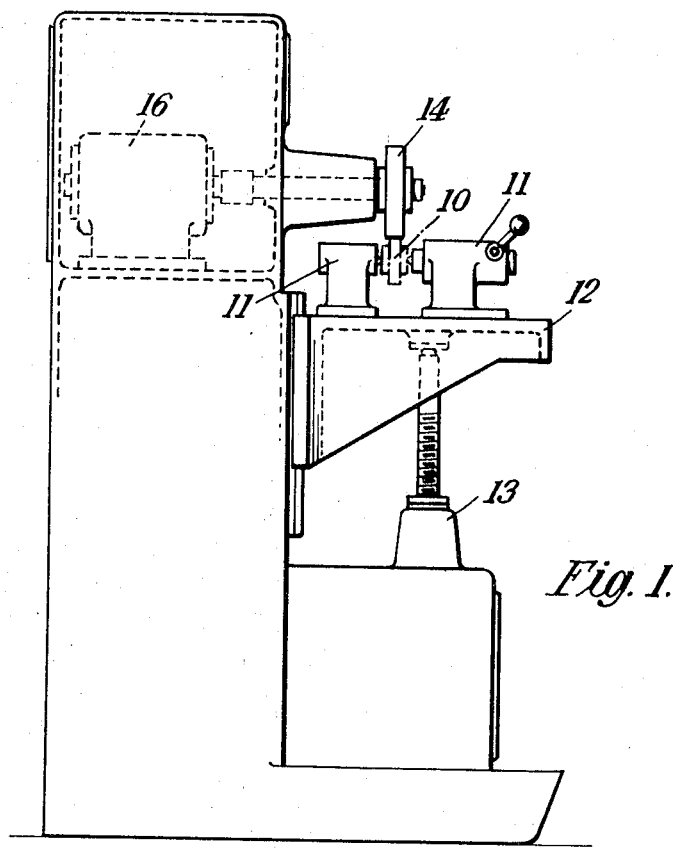
Figure 2:
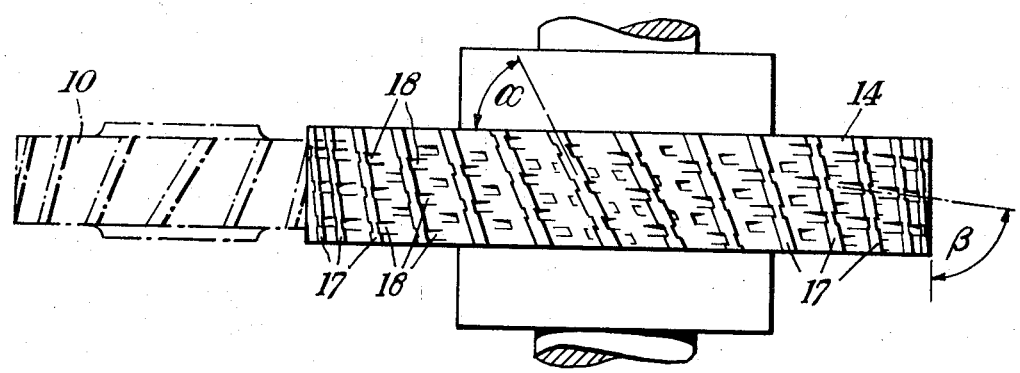
Figure 4:
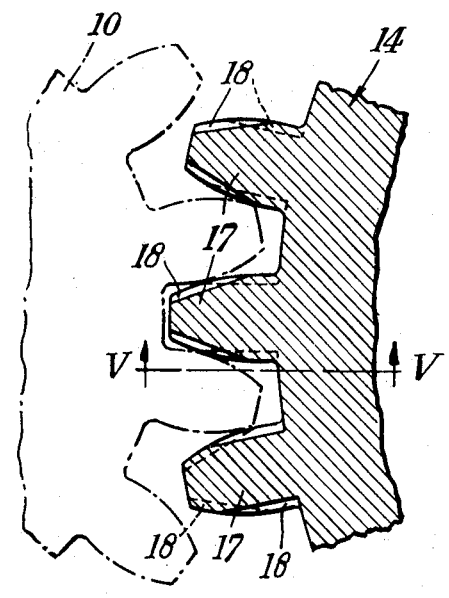
Figure 3:
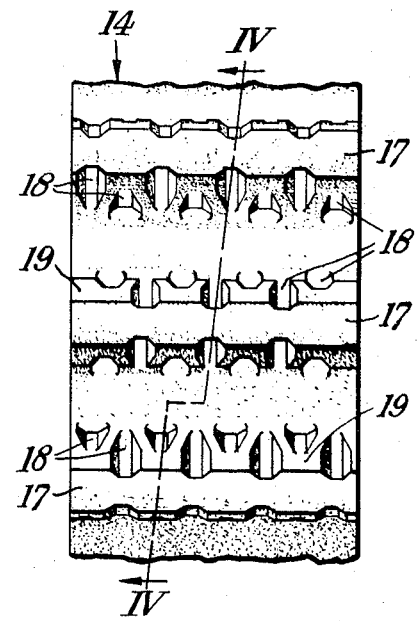
Figure 5:
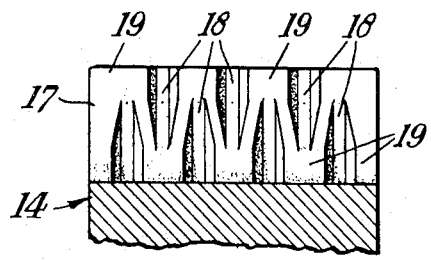

The invention will now be further described with reference to the accompanying diagrammatic drawings, in which, FIG. 1 is a plan view of a gear rolling machine, FIG. 2 is a diagram illustrating a helical gear in mesh with a forming tool, FIG. 3 is an edge view showing part of a tool for forming a spur gear, FIG. 4 is a section on the line IV — IV in FIG. 3, and FIG. 5 is a section on the line V — V in FIG. 4.

The machine shown in FIG. 1 is generally similar to the gear showing machine described in British specification No. 987,972, being modified to provide an up-feed for the work gear appropriate for gear rolling and to dispense with traverse of the work gear. The work gear 10 is freely rotatable in stocks 11 on a table 12 supported on a knee 13 containing mechanism for feeding the work gear upwardly towards a forming tool 14, rotatably mounted on a column 15, with its axis parallel to that of the work gear 11, and driven by a motor 16.

As shown in FIG. 2, the width of the tool 14 is normally greater than that of the work gear 10, although the width of the two may be the same. The helix angle $\alpha$ of the teeth on the tool is nominally the same as that of the teeth on the work gear and is of course zero in the case of a spur gear.

As shown most clearly in FIGS. 3–5, the flanks of the teeth 17 are serrated to provide flutes 18 and lands 19, the flutes extending at right angles to the axis of the tool. Alternate flutes start at the tip and at the root of the tooth flank and the flutes are distributed regularly, each flute in the tip series being midway between two flutes in the root series. The length of the flutes is preferably from 50 to 90 percent of the length of the tooth flanks.

The flutes 18 on successive teeth 17 are staggered so that corresponding flutes on consecutive teeth form helices on the circumference of the tool at a helix angle $\beta$.

The work cycle is as follows. The work gear is loaded into the machine at a position in which its axis is parallel to but remote from that of the tool 14. After the tool has started to rotate radial feed is applied to the work gear to bring them into mesh. Alternatively such radial feed could be applied to the tool. After the radial feed has terminated, at the required minimum distance between the centres of the tool and the work gear, the tool is permitted to continue rotation for a predetermined time. Radial separation between the tool and the work gear then takes place. If desired, before radial separation is effected the tool may be run in the reverse direction for a predetermined length of time.

By adjusting the length and shape of the flutes in the tooth flanks of the tool to suit each particular application it is possible so to control the flow of metal along the tooth flanks of the work gear as to achieve maximum accuracy of the finished product.

What I claim as my invention and desire to secure by Letters Patent is:

1. A toothed tool for finish forming, by rolling, a cylindrical or helical work gear, said tool having, in the flanks of its teeth, serrations extending perpendicular to the axis of the tool which define flutes in the tooth flanks and intervening lands, the flutes on each tooth flank extending alternately from the tip towards the root and from the root towards the tip and extending along part only of the length of the tooth flank and being so disposed that corresponding flutes on successive tooth flanks are disposed helically on the circumference of the tool.

2. A tool as claimed in claim 1, in which the length of the flutes is from 50 to 90 percent of the length of the tooth flanks.

* * * * *